United States Patent
Lee et al.

(10) Patent No.: US 7,405,842 B2
(45) Date of Patent: Jul. 29, 2008

(54) METHOD FOR CORRECTING MAGNIFICATION

(75) Inventors: Chen-Ho Lee, Hsin-Chu (TW); Chen-Hsiang Shih, Chang-Hua (TW); Kuan-Yu Lee, Taichung (TW)

(73) Assignee: Transpacific IP Ltd., Taipei (TW)

( * ) Notice: Subject to any disclaimer, the term of this patent is extended or adjusted under 35 U.S.C. 154(b) by 1158 days.

(21) Appl. No.: 10/136,350

(22) Filed: May 2, 2002

(65) Prior Publication Data
US 2003/0206233 A1 Nov. 6, 2003

(51) Int. Cl.
*G06K 15/02* (2006.01)
*H04N 1/04* (2006.01)
*H04N 1/46* (2006.01)

(52) U.S. Cl. .................. 358/1.2; 358/474; 358/475; 358/513

(58) Field of Classification Search ............ 340/240.99, 340/22, 47–48; 700/213; 212/284; 347/19, 347/16; 358/1.2, 475, 513, 474; 355/56, 355/55; 399/197; 359/354, 380; 382/209, 382/305; 348/188, 180, 181, 187, 240.99, 348/22, 47–48
See application file for complete search history.

(56) References Cited

U.S. PATENT DOCUMENTS 4,724,330 A * 2/1988 Tuhro ........................ 356/614
5,892,543 A * 4/1999 Zheng et al. ................ 348/347

* cited by examiner

*Primary Examiner*—Houshang Safaipour
(74) *Attorney, Agent, or Firm*—Stolowitz Ford Cowger LLP

(57) ABSTRACT

A method for correcting magnification in a photographic device is disclosed in this present invention. The point of this invention is that the magnification ratio of a photographic device is saved into a nonvolatile memory and read out for correcting the magnification in the photographic device, so that the image with correct dimension can be output from the photographic device. Therefore, this invention can provide a more efficient method for correcting magnification in a photographic device, and the quality of the image captured by the photographic device can be improved thereby.

8 Claims, 2 Drawing Sheets

METHOD FOR CORRECTING MAGNIFICATION

BACKGROUND OF THE INVENTION

1. Field of the Invention

This present invention relates to a method for image correction, and more particularly to a method for correcting the magnification in a photographic device.

2. Description of the Prior Art

Before capturing an image of an object, it is important to perform the correct preliminary processes on a photographic device. Due to the inaccuracy of the photo mechanism in the photographic device during the manufacturing and assemblage thereof, there is a difference in dimension between the image captured by the photographic device and the objective. In the prior art, a mark disposed in the photographic device is employed for correcting the above-mentioned difference between the captured image and the objective. While the photographic device captures the image from an object, the photographic device will also capture the image of the mark. The magnification in the photographic device is corrected by the image of the above-mentioned mark in the photographic device. For example, referring to FIG. 1, in a scanner according to the prior art, a mark 20 is disposed in one side of the scanning window 30 of the scanning plate 10. The above-mentioned scanner will scan the object and the mark 20 at the same time, and the magnification in the scanner is corrected by comparing the dimension of the image captured from the mark 20 and the real dimension of mark 20.

However, in the above-cited correcting method, it is very inconvenient and inefficient that the scanner has to scan mark 20 in order to correct the magnification of the scanner after every image captured. On the other hand, in the above-mentioned correcting method, the scanner has to occupy a part where the mark 20 is disposed. Hence, it is important to develop an efficient method for correcting the magnification in a photographic device to output the image with the correct dimensions.

SUMMARY OF THE INVENTION

In accordance with the present invention, a method is provided for correcting the magnification in a photographic device to output the image with the same dimensions as the object. Additionally, it isn't necessary to form a mark in the photographic device for correcting the magnification therein.

It is another object of this invention to provide a method for correcting the magnification in a photographic device, wherein the magnification is corrected by reading a magnification ratio from nonvolatile memory. By this, the photographic device may not capture the image of a mark for correcting the magnification in the photographic device after every image captured.

Still another object of this invention is to provide a method for correcting the magnification in a photographic device, wherein the correcting method is performed when the photographic device is booted, thereby the photographic device can output images with the correct dimensions.

In accordance with the above-mentioned objects, the invention provides a method for correcting the magnification in a photographic device. Through reading a magnification ratio from a nonvolatile memory, the method according to this invention can correct the magnification in the photographic device to output images with the correct dimensions from the photographic device. Therefore, the method for correcting the magnification in a photographic device in this invention can improve the quality and the efficiency of the image capturing of the photographic device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
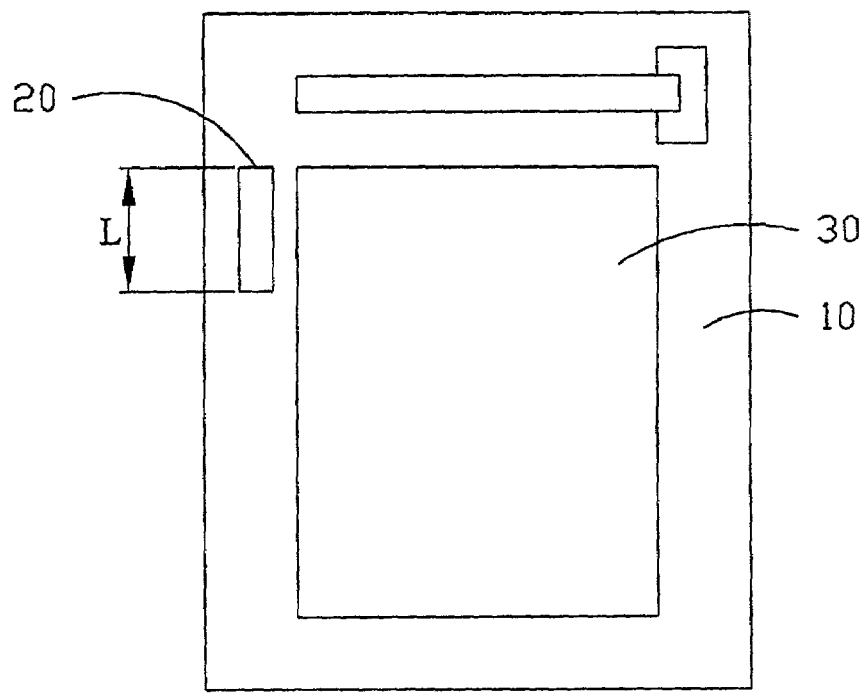
FIG. 1 is a diagram showing a photographic device in prior art.
Figure 2:
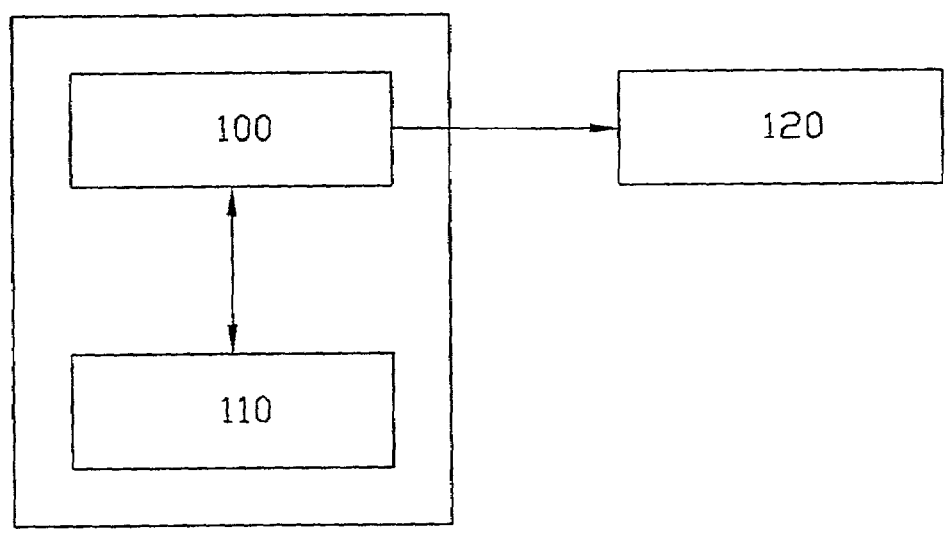
FIG. 2 is a schematic representation showing a photographic device according to this present invention.

One preferred embodiment of this invention is a method for correcting the magnification in a photographic device. At first, during the product testing for a photographic device, a magnification ratio in the photographic device is obtained. That is, when testing the photographic device, a program is employed for calculating the deviation in dimension between a first distance within the object and a secondary distance, corresponding to the first distance, within the image captured by the photographic device, and the magnification ratio is obtained. The magnification ratio may be saved into a nonvolatile memory. When the photographic device is utilized, the magnification ratio will be read from the nonvolatile memory, and employed to correct the magnification in the photographic device. Referring to FIG. 2, after obtaining the magnification ratio in the photographic device 100, the magnification ratio is saved into a nonvolatile memory 110. When the photographic device 100 is utilized to capture an image, the magnification ratio is read from the nonvolatile memory 110 to correct the magnification in the photographic device 100. Therefore, after correcting the magnification in the photographic device 100 with the magnification ratio, the photographic device 100 can provide images with correct dimensions from the output 120 of the photographic device 100.

Figure 3:
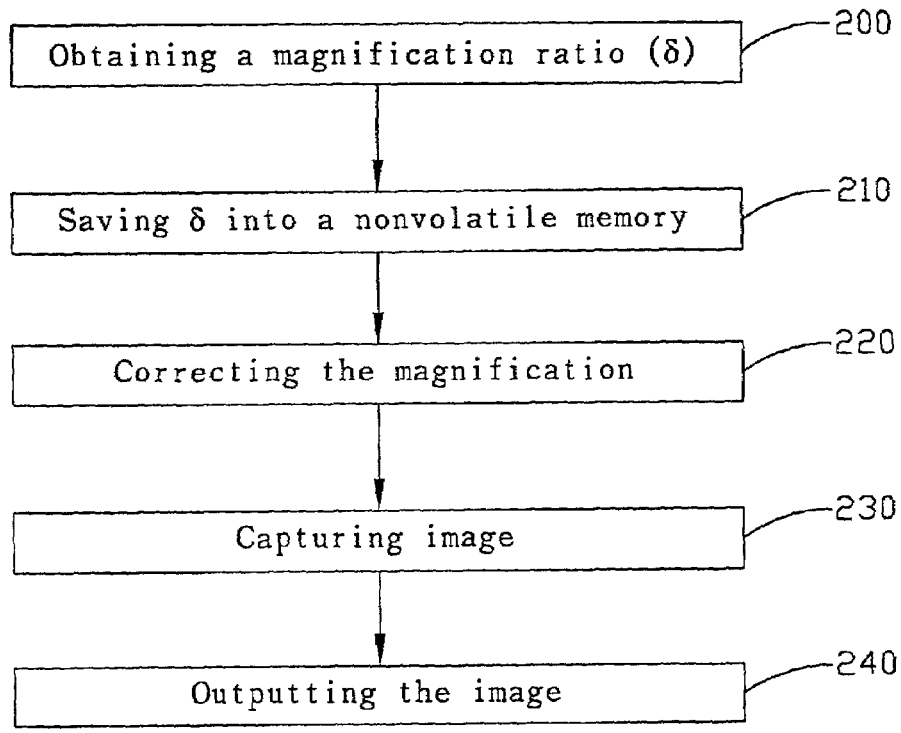
FIG. 3 is a flow chart showing the method for correcting the magnification in a photographic device according to this invention.

Another embodiment of present invention a method for correcting the magnification in a photographic device. The above-mentioned photographic device may be a scanner. FIG. 3 is a flow chart of the correcting method according to this embodiment. At first, a magnification ratio ($\delta$) of a photographic device is obtained during the product test for the photographic device (step 200), wherein the product testing is an auto-program test, a manual test, or like test. The above-mentioned magnification ratio $\delta$ is described as follows. At first, as a standard chart is utilized, the photographic device is employed to capture an image corresponding to the standard chart. The standard chart comprises a first distance between a pair of marks, and the image comprises a secondary distance corresponding to the first distance. The above-cited magnification ratio δ is based on calculating the deviation between the first distance and the secondary distance with a program. The program, employed for calculating the deviation between the first distance and the secondary distance, may be a program within the software of the photographic device. The magnification ratio δ can be calculated as shown in the following formula 1.

$$\delta = (\Delta/L_0) \times 100\% \quad \text{(formula 1)}$$

In formula 1, $L_0$ is the first distance within the standard chart, and $\Delta$ is the scale deviation between the first distance and the secondary distance corresponding to the first distance. In practice, the magnification ratio δ also can be defined as the ratio of a dimension within the standard chart, such as the first distance between the marks within the standard chart, and the corresponding dimension within the image, such as the secondary distance corresponding to the first distance, as shown in formula 2 hereinafter.

$$\delta = (L_1/L_0) \times 100\% \quad \text{(formula 2)}$$

In formula 2, $L_0$ is the first distance within the standard chart utilized in the product testing, and $L_1$ is the secondary distance, corresponding to the first distance, within the image.

In this embodiment, the magnification ratio δ from the above-cited methods is saved into a nonvolatile memory, as shown in step 210. The nonvolatile memory may be electrically erasable and programmable read-only memory (EEPROM), electronically programmable read-only memory (EPROM), and the like electronic member. When the photographic device according to this embodiment is booted, the magnification ratio δ is read from the nonvolatile memory and employed to correct the magnification in the photographic device (step 220). After correcting the magnification with the magnification ratio δ, the image capturing process in the photographic device is performed, as step 230. Thereby the image with correct dimensions is exhibited at the output of the photographic device, as shown in step 240.

One character of this embodiment is saving the magnification ratio δ into a nonvolatile memory such that the magnification ratio δ can be read from the nonvolatile memory and employed to correct the magnification of the photographic device. Therefore, in the photographic device according to this embodiment, the mark utilized to correct the magnification, as in the prior art, can be removed from the photographic device, and there is more space in the photographic device wherein the space may be employed for other application.

Moreover, after correcting the magnification as the photographic device is booted, the photographic device according to this embodiment can output images with correct dimensions. In contrast to the photographic device in the prior art, wherein the photographic device should correct the magnification with a mark positioned within the photographic device during every image capturing, the photographic device according to this embodiment is more efficient in correcting the magnification of the photographic device.

Figure 4:
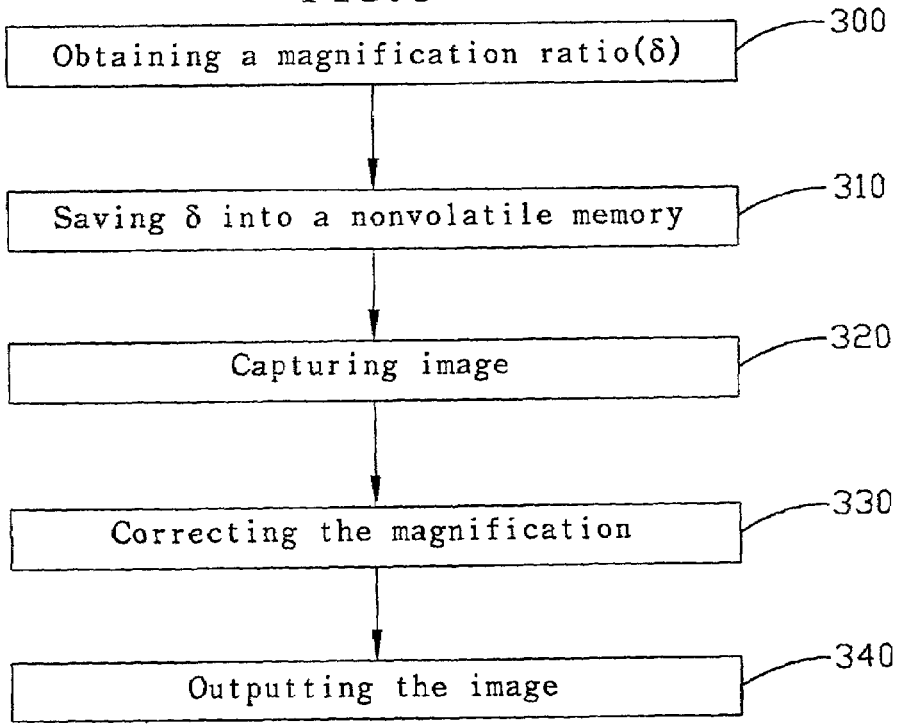
FIG. 4 is a flow chart showing the method for correcting the magnification in a photographic device according to this invention.

Another embodiment of this present invention is a method for correcting the magnification in a photographic device. The above-mentioned photographic device may be a scanner. FIG. 4 is a flow chart according to this embodiment. First of all, after the product testing for a photographic device, the magnification ratio (δ) of the photographic device can be obtained by the above-cited methods (step 300), and saved into a nonvolatile memory, as shown in step 310. The nonvolatile memory may be EEPROM, EPROM, and like items.

After employing the photographic device to capture image from the objective (step 320), the magnification ratio δ, obtained in step 300, will be read from the above-mentioned nonvolatile memory, and utilized to correct and regress the magnification of the image captured by the photographic device, as shown in step 330. After the above-cited step for correcting the magnification of the image, the photographic device in this embodiment can output the image with correct dimensions, as shown in step 340.

In contrast to the photographic device in the prior art, wherein the photographic device has to correct the magnification before image capturing, the photographic device according to this embodiment is not necessary to perform the step for correcting the magnification before image capturing. After capturing the image, the magnification ratio δ will be automatically read from the above-mentioned non-volatile memory by driving software or a like method, and the image captured by the photographic device is corrected/regressed with the magnification ratio δ. That is, the photographic device according to this embodiment can save steps for correcting the magnification in the photographic device before image capturing. Therefore, the method for correcting the magnification in a photographic device is more efficient in correcting the magnification in a photographic device.

According to the preferred embodiment, this invention discloses a method for correcting the magnification in a photographic device. The magnification ratio of the photographic device is saved into a nonvolatile memory. When the photographic device performing magnification correction, the above-mentioned magnification ratio can be read from the nonvolatile memory and the magnification in the photographic device can be corrected/regressed with the magnification ratio to obtain an image with correct dimensions. Moreover, the method according to this present invention can not only save space from a positioned mark for correcting the magnification in the photographic device in the prior art, but also simplify the process for correcting the magnification in a photographic device. Thus, this invention discloses a more efficient method for correcting the magnification in a photographic device, and thus the method according to this invention can improve the efficiency for capturing an image in a photographic device and the quality of the image captured by the photographic device.

Although specific embodiments have been illustrated and described, it will be obvious to those skilled in the art that various modifications may be made without departing from what is intended to be limited solely by the appended claims.

What is claimed is:

1. A method for correcting magnification, comprising:
capturing an image from a chart;
determining a deviation between a first distance obtained from the chart and a second distance obtained from the image captured from the chart to determine a magnification ratio for a photographic device; wherein said determining a deviation comprises calculating a difference between the first distance and the second distance; and
storing the magnification ratio in the photographic device;
wherein said deviation is determined based at least in part on the following:

$$\delta = (\Delta/L_0) \times 100\%,$$

wherein $L_0$ comprises the first distance, δ comprises a magnification ratio, and Δ comprises said deviation between said first distance and said second distance.

2. A method for correcting magnification, comprising:
capturing an image from a chart:
determining a deviation between a first distance obtained from the chart and a second distance obtained from the image captured from the chart to determine a magnification ratio for a photographic device; wherein said determining a deviation comprises calculating a difference between the first distance and the second distance; and storing the magnification ratio in the photographic device; wherein said deviation is determined based at least in part on the following:

$$\delta = (L_1/L_o) \times 100\%,$$

wherein $L_o$ comprises said first distance, $\delta$ comprises a magnification ratio, and $L_1$ comprises said second distance.

3. A method for correcting magnification, comprising:

obtaining an image of an object;

adjusting said image using a magnification ratio, the magnification ratio being based at least in part on a determined deviation between a first distance obtained from a chart and a second distance obtained from an image of the chart, wherein the first distance corresponds with said second distance and wherein said deviation is determined based at least in part on the following:

$$\delta = (\Delta/L_o) \times 100\%,$$

wherein $L_o$ comprises the first distance, $\delta$ comprises the magnification ratio, and $\Delta$ comprises said deviation between said first distance and said second distance.

4. A scanner, comprising:

means for obtaining an image from a chart, wherein said chart comprises a first distance and said image comprises a second distance corresponding to said first distance;

means for determining a deviation between said first distance and said second distance to obtain a magnification ratio of the scanner; and means for storing said magnification ratio wherein said means for determining said deviation comprises means for determining said deviation based at least in part on the following:

$$\delta = (\Delta/L_o) \times 100\%,$$

wherein $L_o$ comprises the first distance, $\delta$ comprises the magnification ratio, and $\Delta$ comprises said deviation between said first distance and said second distance.

5. A scanner, comprising:

means for obtaining an image from a chart, wherein said chart comprises a first distance and said image comprises a second distance corresponding to said first distance;

means for determining a deviation between said first distance and said second distance to obtain a magnification ratio of the scanner; and means for storing said magnification ratio wherein said means for determining said deviation comprises means for determining said deviation based at least in part on the following:

$$\delta = (L_1/L_o) \times 100\%,$$

wherein $L_o$ comprises said first distance, $\delta$ comprises the magnification ratio, and $L_1$ comprises said second distance.

6. A method for correcting magnification, comprising:

obtaining an image of an object; adjusting said image using a magnification ratio, the magnification ratio being based at least in part on a determined deviation between a first distance obtained from a chart and a second distance obtained from an image of the chart, wherein the first distance corresponds with said second distance wherein said deviation is determined based at least in part on the following:

$$\delta = (L_1/L_o) \times 100\%,$$

wherein $L_0$ comprises the first distance, $\delta$ comprises the magnification ratio, and $L_1$ comprises the second distance.

7. An apparatus, comprising: a sensor configured to capture an image of a chart;

a processor configured to determine a deviation between a first distance obtained from the chart and a second distance obtained from the image to determine a magnification ratio;

a memory to store the magnification ratio:

wherein the processor is further configured to determine the deviation based at least in part on the following:

$$\delta = (\Delta/L_0) \times 100\%,$$

wherein $L_0$ comprises the first distance, $\delta$ comprises the magnification ratio, and $\Delta$ comprises said deviation between said first distance and said second distance.

8. An apparatus, comprising:

a sensor configured to capture an image of a chart;

a processor configured to determine a deviation between a first distance obtained from the chart and a second distance obtained from the image to determine a magnification ratio;

a memory to store the magnification ratio;

wherein the processor is further configured to determine the deviation based at least in part on the following:

$$\delta = (L_1/L_0) \times 100\%,$$

wherein $L_0$ comprises the first distance, $\delta$ comprises the magnification ratio, and $L_1$ comprises the second distance.

* * * * *

UNITED STATES PATENT AND TRADEMARK OFFICE
CERTIFICATE OF CORRECTION

| | |
|---|---|
| PATENT NO. | : 7,405,842 B2 |
| APPLICATION NO. | : 10/136350 |
| DATED | : July 29, 2008 |
| INVENTOR(S) | : Lee |

It is certified that error appears in the above-identified patent and that said Letters Patent is hereby corrected as shown below:

Column 4 (Claim 1) line 59: DELETE "$\delta = (\Delta/L_0) \times 100\%$, wherein $L_O$ comprises"

INSERT -- $\delta = (\Delta/L_0) \times 100\%$, wherein $L_0$ comprises --

Column 4 (Claim 2) line 65: DELETE "chart:" and INSERT -- chart; --

Column 5 (Claim 2) line 9: DELETE "$\delta = (\Delta/L_0) \times 100\%$, wherein $L_O$ comprises"

INSERT -- $\delta = (\Delta/L_0) \times 100\%$, wherein $L_0$ comprises --

Column 5 (Claim 3) line 24: DELETE "$\delta = (\Delta/L_0) \times 100\%$, wherein $L_O$ comprises"

INSERT -- $\delta = (\Delta/L_0) \times 100\%$, wherein $L_0$ comprises --

Column 5 (Claim 4) line 40: DELETE "$\delta = (\Delta/L_0) \times 100\%$, wherein $L_O$ comprises"

INSERT -- $\delta = (\Delta/L_0) \times 100\%$, wherein $L_0$ comprises --

Column 6 (Claim 5) line 5: DELETE "$\delta = (\Delta/L_0) \times 100\%$, wherein $L_O$ comprises"

INSERT -- $\delta = (\Delta/L_0) \times 100\%$, wherein $L_0$ comprises --

Signed and Sealed this
Twenty-sixth Day of July, 2011

David J. Kappos
*Director of the United States Patent and Trademark Office*

CERTIFICATE OF CORRECTION (continued)  
U.S. Pat. No. 7,405,842 B2

Column 6 (Claim 6) line 10-22: DELETE "A method for correcting magnification, comprising: obtaining an image of an object; adjusting said image using a magnification ratio, the magnification ratio being based at least in part on a determined deviation between a first distance obtained from a chart and a second distance obtained from an image of the chart, wherein the first distance corresponds with said second distance wherein said deviation is determined based at least in part on the following:

$\delta = (L_1/L_0) \times 100\%$, wherein $L_O$ comprises the first distance, $\delta$ comprises the magnification ratio, and $L_1$ comprises the second distance."

and

INSERT -- A method for correcting magnification, comprising: obtaining an image of an object; adjusting said image using a magnification ratio, the magnification ratio being based at least in part on a determined deviation between a first distance obtained from a chart and a second distance obtained from an image of the chart, wherein the first distance corresponds with said second distance wherein said deviation is determined based at least in part on the following:

$\delta = (L_1/L_0) \times 100\%$, wherein $L_0$ comprises the first distance, $\delta$ comprises the magnification ratio, and $L_1$ comprises the second distance. --

Column 6 (Claim 7) line 23-36: DELETE "An apparatus, comprising: a sensor configured to capture an image of a chart;

a processor configured to determine a deviation between a first distance obtained from the chart and a second distance obtained from the image to determine a magnification ratio;

a memory to store the magnification ratio:

wherein the processor is further configured to determine the deviation based at least in part on the following:

$\delta = (\Delta/L_0) \times 100\%$, wherein $L_O$ comprises the first distance, $\delta$ comprises the magnification ratio, and $\Delta$ comprises said deviation between said first distance and said second distance."

and

CERTIFICATE OF CORRECTION (continued)
U.S. Pat. No. 7,405,842 B2

INSERT -- An apparatus, comprising:

a sensor configured to capture an image of a chart;

a processor configured to determine a deviation between a first distance obtained from the chart and a second distance obtained from the image to determine a magnification ratio;

a memory to store the magnification ratio;

wherein the processor is further configured to determine the deviation based at least in part on the following:

$\delta = (\Delta/L_0) \times 100\%$, wherein $L_0$ comprises the first distance, $\delta$ comprises the magnification ratio, and $\Delta$ comprises said deviation between said first distance and said second distance. --

Column 6 (claim 8) line 46: DELETE "$\delta = (\Delta/L_0) \times 100\%$, wherein $L_O$ comprises"

INSERT -- $\delta = (\Delta/L_0) \times 100\%$, wherein $L_0$ comprises --